United States Patent Office 3,810,822
Patented May 14, 1974

3,810,822
PROCESS FOR OBTAINING A PHOSPHO-
DIESTERASE FROM DICTYOSTELIUM
DISCOIDEUM
Günther Gerisch, Tubingen, Germany, assignor to Max-
Planck-Gesellschaft zur Forderung der Wissenschaften
e.V., Gottingen, Germany
No Drawing. Filed July 10, 1972, Ser. No. 269,960
Claims priority, application Germany, July 8, 1971,
P 21 34 141.3
Int. Cl. C12d *13/10*
U.S. Cl. 195—65     8 Claims

ABSTRACT OF THE DISCLOSURE

New process for obtaining a highly active phosphodiesterase from the culture fluid of the mutant mold *Dictyostelium discoideum* aggr 75 by separating the protein therefrom.

---

The present invention relates to a process for obtaining the enzyme phosphodiesterase from the mold *Dictyostelium discoideum*.

Adenosin - 3',5' - cyclophosphate, hereinafter called cAMP, controls biochemical reactions and is known as "second messenger." The substance influences the effect of several hormones, controls the formation of certain enzymes in bacteria and has also other effects. Phosphodiesterases, which split the cyclic phosphate ring of cAMP, are of value for experimental, diagnostic and possibly for pharmaceutical purposes. The Michaelis' constant ($K_m$) of the enzyme is of special importance in this connection. Only enzymes with a low $K_m$ are suitable for splitting the cAMP present in the biological material, since the concentration of the cAMP is very low in this material. Liver tissue contains for example only $5 \times 10^{-9}$ mol./g., muscle tissue contains $1 \times 10^{-9}$ mol./g.

It is known (Y. Y. Chang, Science 161, 57/1968) that Dictyostelium produces a cAMP-phosphodiesterase having a $K_m$ of about $10^{-3}$. Due to this comparatively high $K_m$, the enzyme does not seem to be favorable for commercial uses. Moreover, Dictyostelium forms an inhibitor for the phosphodiesterase which necessitates that a precise timing for obtaining the enzyme must be observed. Within only one hour, the enzyme activity decreases distinctly. Accordingly, it is hardly possible to take this as a basis for a commercial production. Now it has been surprisingly found that certain mutants of Dictyosteluim do not show the mentioned disadvantages in that they do not form any inhibitor and form a phosphodiesterase having a very low $K_m$ in concentrations far higher than are available from the wild type.

Accordingly, the present invention relates to a process for obtaining a phosphodiesterase from the culture medium of *Dictyostelium discoideum*, wherein the mutant aggr 75 is used and wherein the enzyme is recovered from the culture medium according to usual biochemical methods and is subjected to a further purification, if desired.

According to the process of the present invention, there is obtained a phosphodiesterase having a $K_m$ between $2 \times 10^{-6}$ and $3 \times 10^{-6}$ as determined by the phosphatase-deaminase-method for cAMP in accordance with H. U. Bergmeyer, "Methoden der enzymatischen Analyze," Weinheim, 1970. This value is about 3 decimal powers lower than the $K_m$ of the known phosphodiesterase from Dictyostelium.

*Dictyostelium discoideum* aggr 75 is deposited under this designation in the culture collection of the Institut für technische Mikrobiologie der Technischen Universität München at Weihenstephan.

The micro-organisms used in accordance with the present invention are characterized by releasing the enzyme into the culture medium from which the enzyme can be recovered in a simple manner.

R-mutants of intestinal bacteria, e.g. the strain Escherichia coli B/r, are suitable as a nutrient substrate for growing the molds of the invention in suspension cultures. The bacteria are cultivated in a suitable nutritive solution up to about the maximum bacteria concentration and are then inoculated with spores of the Dictyostelium strain to be used in accordance with the present invention. Either fermentor cultures or shaking cultures may be used. The mold is preferably harvested about 10 to 15 hours after the consumption of the bacteria.

A supernatant solution containing enzymes is obtained by centrifuging the culture.

The active protein fraction containing the phosphodiesterase is isolated according to usual biochemical methods, preferably by precipitation. Suitable precipitants are salts, such as ammonium sulfate; organic solvents, such as alcohol or acetone and the like, ammonium sulfate being preferred up to 60% saturation. The precipitated protein is recovered according to usual methods, e.g. by centrifugation, filtration or the like. The thus obtained phosphodiesterase can be used directly although further purification is preferred.

Non-purified supernatants of centrifuged *Dictyostelium discoideum* cultures contain about 50 µg. protein/ml. (determined according to Lowry) and those of the mutant aggr 75 have an enzyme activity of about 400 units/ml. (1 unit splits 1 N mol cAMP/min. at 35° C.).

The product is preferably dialyzed against diluted neutral buffer in order to remove precipitant residues. A further purification can be effected by chromatography on a weakly basic anion exchanger. Cellulose modified by diethylaminoethanol is an example of a suitable anion exchanger.

Molecular sieve fractionation offers another possibility for purification. Cross-linked dextrane is a suitable molecular sieve material. The crude supernatant of the centrifuged culture fluid is preferably concentrated before the separation of the protein, preferably to about 5 to 10% of the starting volume by partial removal of water. Suitable concentration methods are ultrafiltration, dialysis against polyethylene glycol having an average molecular weight of approximately 20,000 or vacuum evaporation at elevated temperatures, e.g. in a rotating evaporator at about 30° C. into an ice-cooled receiver. However, evaporation reduces enzyme activity by about 50% at a working temperature of about 33° C. Accordingly, ultrafiltration is preferred.

The process in accordance with the present invention provides a cAMP-phosphodiesterase having an extremely low $K_m$ and a very high specific activity if purified.

A very small amount of enzyme protein produces very active solutions. This improves the accuracy of cAMP determinations, but is particularly important for therapeutical uses in which immune reactions are to be avoided.

It is a special advantage of the process according to the present invention that the phosphodiesterase is only slightly inhibited by the mold strain used. Accordingly, the timing of the harvest is not critical and the high enzyme level in the culture fluid is maintained for a prolonged period of time. In cultures of the wild strain, the activity decreases distinctly within shows in addition to the extremely high enzyme activity has the advantage of forming spores. Accordingly, inoculation material for the culture can be recovered and preserved without difficulties. Lyophilized spores remain unchanged for decades, as is known.

The mutant mold strain according to the present invention is superior to the wild strain in that, for example, the maximum phosphdiesterase activity determined for the latter was 27 units/ml. compared with 415 units/ml. for aggr 75.

The following example is given for the purpose of illustrating the present invention, it should be noted, however, that the invention is not restricted thereto.

EXAMPLE

(A) Culture of Dictyostelium aggr 75

The mold is cultured in accordance with the method described in "Roux'Archiv Entwicklungsmechanik der Organismen," 152, 632 (1960). *Escherichia coli*-bacteria are grown on standard I nutritive bouillon (Merck, Darmstadt) to a density of $7 \times 10^9$ bacteria/ml. and are subsequently removed by centrifugation. The sediment is taken up in M/60 aqueous phophate buffer pH 6.0, adjusted to $1 \times 10^{10}$ bacteria/ml. and is inoculated with spores of Dictyostelium aggr 75. The mold is grown in shaking cultures containing 300 ml. liquid in a 1 l. Erlenmayer flask, or in fermentor cultures. The harvest is made 12 hours after consumption of the bacteria.

(B) Recovery of the phosphodiesterase

The cultures are centrifuged at about 1000 g. The sediment consisting of cells is discarded.

The supernatant is concentrated by ultrafiltration (diaflo-membrane type PM 10) to 5 to 10% of the starting volume. Ammonium sulfate is dissolved in the concentrate to added to the thus concentrated culture supernatant to 60% saturation. The precipitate is removed by centrifugation, the supernatant is discarded. The precipitate is subsequently taken up in 0.005 M trisbuffer pH 7.0 and is dialyzed against the same buffer.

The dialyzed solution is passed over a diethyl amino cellulose coulmn and is the retained enzyme eluated with the same buffer. At a concentration of 0.1 M NaCl in the elution agent, practically the entire active fraction is eluted and contains only a very small amount of protein. The main portion of the protein does not show any activity and is washed from the column only upon further increase of the NaCl-concentration to 1 M.

The active fraction may be purified further by chromatography over a column of cross-linked dextrane (Sephadex G 75).

What is claimed is:

1. A process for producing phosphodiesterase which comprises:
    (a) culturing the mold *Dictystelium discoideum* aggr 75 on an aqueous medium containing a substrate capable of supporting growth of said mold until phosphodiesterase accumulates in said medium; and
    (b) recovering the accumulated phosphodiesterase from said medium.
2. A process as set forth in claim 1, wherein said recovering of said phosphodiesterase includes separating the cells of said mold from said medium, and precipitating protein from the cell-free medium, said protein including said phosphodiesterase.
3. A process as set forth in claim 2, wherein said protein is precipitated by dissolving in said cell-free medium an amount of ammonium sulfate effective for precipitating said protein.
4. A process as set forth in claim 2, wherein a portion of the water is removed from said cell-free medium prior to said precipitating.
5. A process as set forth in claim 2, wherein the precipitated protein is fractionated to separate a relatively inactive fraction of the same from a fraction having relatively high enzyme activity.
6. A process as set forth in claim 5, wherein said protein is fractionated by contacting a solution of said protein with a weakly basic anion exchanger until at least said fraction of high enzyme activity is retained on said anion exchanger, and selectively eluting said fraction of relatively high activity.
7. A process as set forth in claim 1, wherein said substrate essentially consists of intestinal bacteria, and said mold is cultured on said medium until said bacteria are consumed.
8. A process as set forth in claim 7, wherein said substrate essentially consists of cells of *Escherichia coli*.

References Cited

Riedel et al., Biochemical and Biophysical Research Comm., vol. 42, No. 1, pp. 119–124 (January 1971).

LIONEL M. SHAPIRO, Primary Examiner